United States Patent
Glugla et al.

(10) Patent No.: US 9,399,459 B2
(45) Date of Patent: *Jul. 26, 2016

(54) METHODS AND SYSTEMS FOR OPERATING AN ENGINE

(71) Applicant: Ford Global Technologies, LLC, Dearborn, MI (US)

(72) Inventors: Chris Paul Glugla, Macomb, MI (US); Michael Damian Czekala, Canton, MI (US); Jeffrey Allen Doering, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 254 days.

This patent is subject to a terminal disclaimer.

(21) Appl. No.: 13/945,671

(22) Filed: Jul. 18, 2013

(65) Prior Publication Data

US 2015/0025723 A1 Jan. 22, 2015

(51) Int. Cl.
| | |
|---|---|
| *B60T 7/12* | (2006.01) |
| *G05D 1/00* | (2006.01) |
| *G06F 7/00* | (2006.01) |
| *G06F 17/00* | (2006.01) |
| *F02B 53/04* | (2006.01) |
| *F02P 5/00* | (2006.01) |
| *F02M 25/07* | (2006.01) |
| *B60W 20/00* | (2016.01) |
| *B60W 10/06* | (2006.01) |
| *B60W 10/08* | (2006.01) |

(52) U.S. Cl.
CPC .............. *B60W 20/108* (2013.01); *B60W 10/06* (2013.01); *B60W 10/08* (2013.01); *B60W 20/15* (2016.01); *B60Y 2400/442* (2013.01); *Y02T 10/6286* (2013.01); *Y10S 903/93* (2013.01)

(58) Field of Classification Search
None
See application file for complete search history.

(56) References Cited

U.S. PATENT DOCUMENTS

| | | | |
|---|---|---|---|
| 8,055,432 B2 | 11/2011 | Sun et al. | |
| 2009/0299560 A1* | 12/2009 | Tomatsuri | F02D 41/0005 701/22 |
| 2012/0023937 A1 | 2/2012 | Styles et al. | |
| 2012/0323469 A1* | 12/2012 | Bucknell | F02D 41/0062 701/108 |
| 2014/0352659 A1* | 12/2014 | Glugla | F02D 41/0087 123/350 |

* cited by examiner

*Primary Examiner* — Yonel Beaulieu
*Assistant Examiner* — Lail Kleinman
(74) *Attorney, Agent, or Firm* — David Kelley; Alleman Hall McCoy Russell & Tuttle LLP (57) ABSTRACT

Systems and methods for improving operation of a hybrid vehicle are presented. In one example, engine operation is adjusted in response to a change in engine operating conditions that result in a fractional amount of cylinder charge comprised of exhaust gas changing by more than a threshold percentage. The approaches describe may improve vehicle drivability and fuel economy.

20 Claims, 4 Drawing Sheets

METHODS AND SYSTEMS FOR OPERATING AN ENGINE

FIELD

The present description relates to a system and methods for improving drivability and fuel economy of a vehicle. The methods may be particularly useful for engines that are coupled to an electrical machine.

BACKGROUND AND SUMMARY

It may be desirable to operate an engine with greater than 25% of gas mass inducted into a cylinder comprised of recirculated exhaust gas. By operating the engine with higher concentrations of recirculated exhaust gas, it may be possible to increase engine efficiency and reduce the possibility of engine knock. The engine may operate at higher EGR concentrations from lower middle engine loads to higher middle engine loads. At lower engine loads, the engine may operate at lower exhaust gas recirculation (EGR) levels since combustion stability at lower engine loads and higher EGR rates may be less than desired.

During driving from one location to another location, a driver may frequently change engine load responsive to driving conditions such that the engine changes from operating at a lower load to operating at a higher load. Likewise, the driver may change engine load responsive to driving conditions such that engine load changes from a higher load to a lower load. Changes in engine speed and load may result in the fraction of exhaust gas entering engine cylinders to be reduced from a higher concentration to a lower concentration to ensure engine combustion stability. However, response of an engine EGR valve and EGR flow dynamics may cause the fraction of EGR entering engine cylinders to briefly increase when it may be desirable to reduce the fraction of EGR entering engine cylinders. Consequently, the increased fraction of EGR may cause the engine to misfire. If the engine misfires, engine emissions and vehicle drivability may degrade.

The inventors herein have recognized the above-mentioned disadvantages and have developed a method for operating an engine, comprising: inducting a gas mixture into a cylinder, a fraction of the gas mixture comprised of exhaust gas, at least a portion of the gas mixture participating in combustion in the cylinder; and entering the engine into a fuel cut-out state in response to an operating condition change that results in the fraction of the gas mixture changing by more than a threshold percentage.

By entering a fuel cut-out state in response to an operating condition change that results in an exhaust gas fraction of a gas mixture inducted to an engine changing by more than a threshold percentage, the technical result of evacuating excess EGR from an engine intake manifold without the engine misfiring may be possible. For example, if a driver at least partially releases an accelerator pedal resulting in a desired 40% reduction in a fraction of exhaust gas entering the engine, the engine may transition into a fuel cut-out state until a fraction of EGR in the engine's intake manifold is less than a threshold fraction of EGR in the intake manifold. In this way, an engine may be operated with a higher EGR concentration without the engine misfiring when engine load changes.

The present description may provide several advantages. Specifically, the approach may reduce driveline torque disturbances of a hybrid driveline. Further, the approach may improve vehicle drivability. Further still, the approach may reduce driveline wear, thereby increasing the operating life of the driveline.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The advantages described herein will be more fully understood by reading an example of an embodiment, referred to herein as the Detailed Description, when taken alone or with reference to the drawings, where.

DETAILED DESCRIPTION

Figure 1:
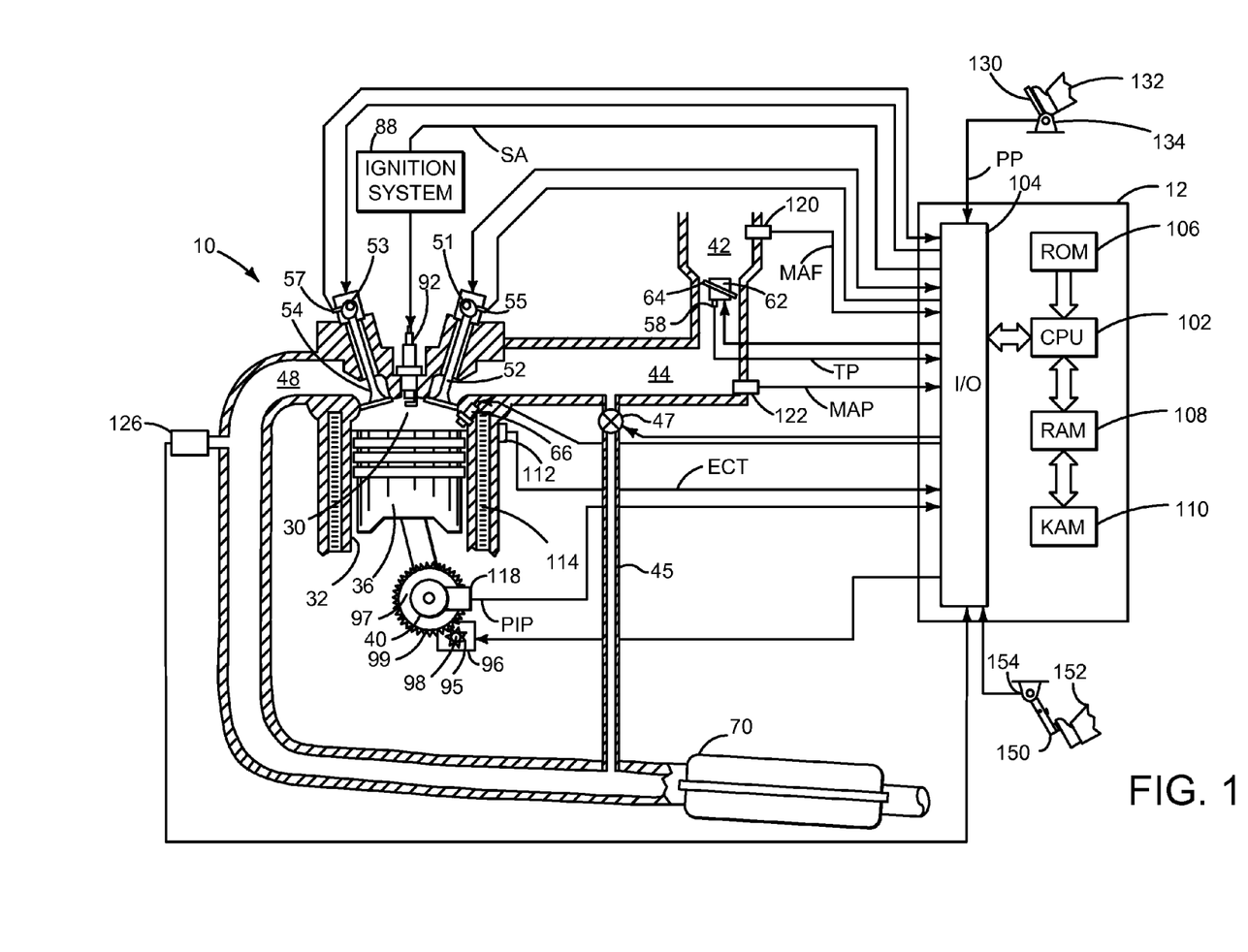
FIG. 1 is a schematic diagram of an engine.
Figure 2:
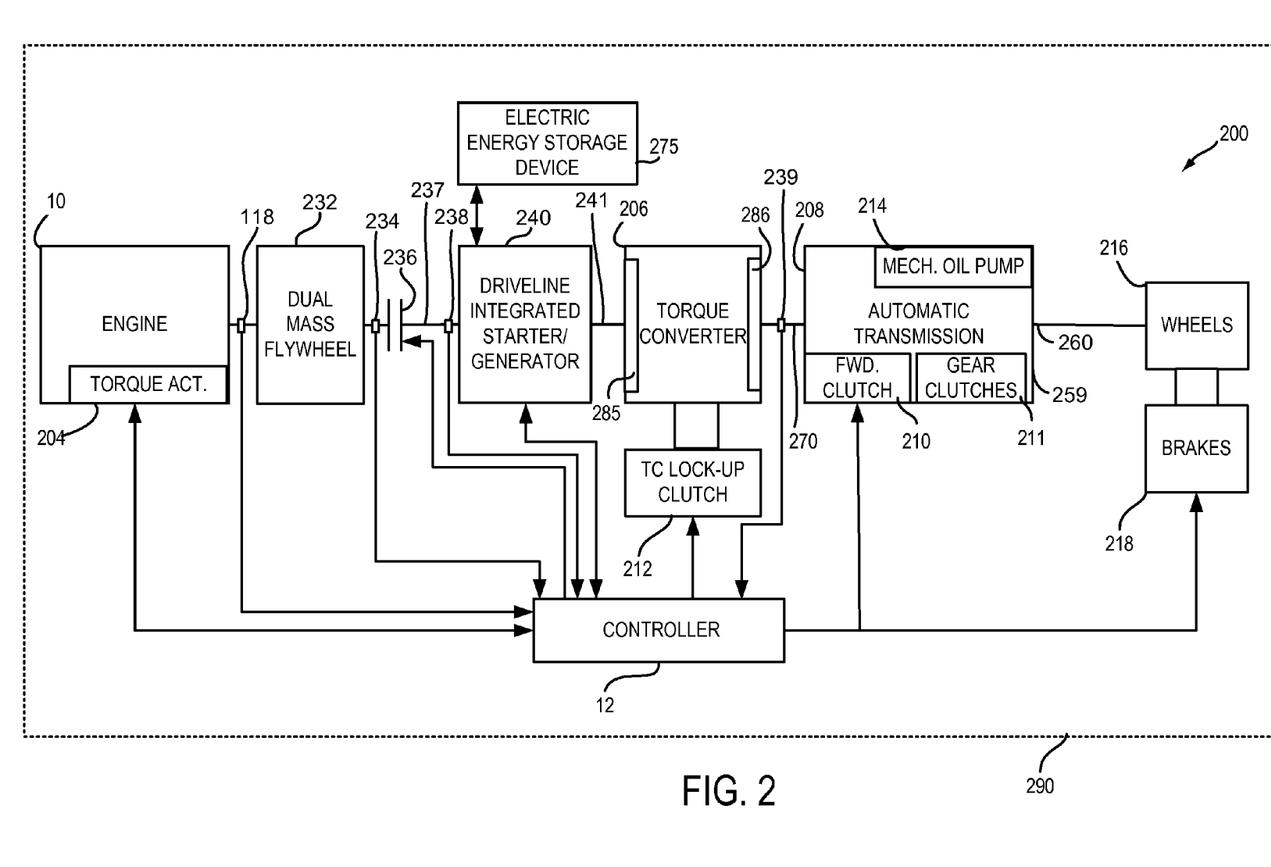
FIG. 2 is shows an example vehicle driveline configuration.
Figure 3:
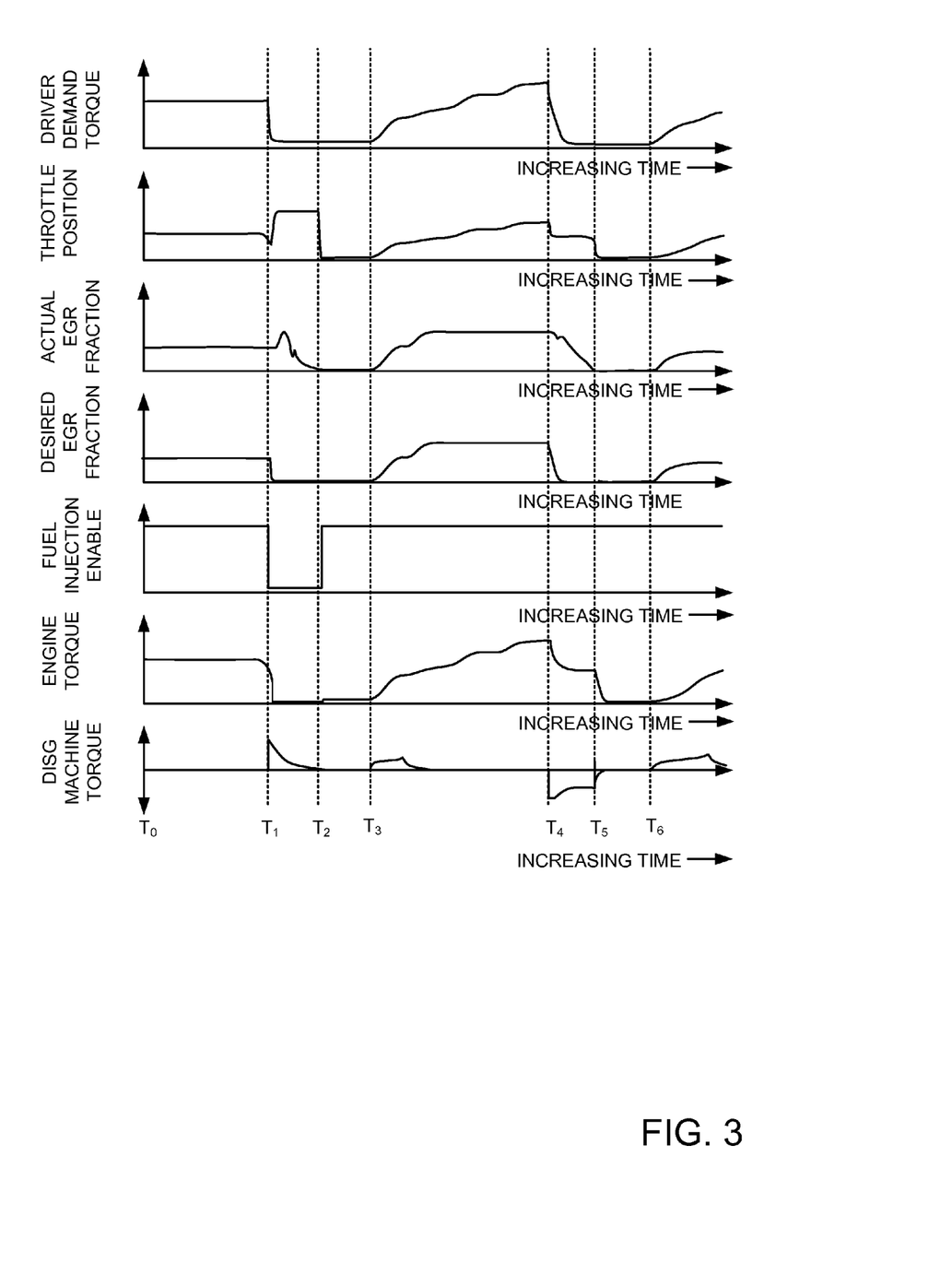
FIG. 3 shows a prophetic vehicle operating sequence.

The present description is related to controlling engine operation of a hybrid vehicle. The hybrid vehicle may include an engine and a driveline integrated starter/generator (DISG) or electric machine as shown in FIGS. 1-2. The engine may be operated with or without the DISG during vehicle operation. The DISG is integrated into the driveline on the same axis as the engine crankshaft and rotates whenever a transmission torque converter impeller rotates. Further, the DISG may not be selectively engaged or disengaged with the driveline. Rather, the DISG is an integral part of the driveline. Further still, the DISG may be operated with or without operating the engine. The engine may be operated as shown in the sequence of FIG. 3 according to the method of FIG. 4.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Flywheel 97 and ring gear 99 are coupled to crankshaft 40. Starter 96 includes pinion shaft 98 and pinion gear 95. Pinion shaft 98 may selectively advance pinion gear 95 to engage ring gear 99. Starter 96 may be directly mounted to the front of the engine or the rear of the engine. In some examples, starter 96 may selectively supply torque to crankshaft 40 via a belt or chain. In one example, starter 96 is in a base state when not engaged to the engine crankshaft. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57. Intake cam 51 and exhaust cam 53 may be moved relative to crankshaft 40.

Fuel injector 66 is shown positioned to inject fuel directly into cylinder 30, which is known to those skilled in the art as direct injection. Alternatively, fuel may be injected to an intake port, which is known to those skilled in the art as port injection. Fuel injector 66 delivers liquid fuel in proportion to the pulse width of signal from controller 12. Fuel is delivered to fuel injector 66 by a fuel system (not shown) including a fuel tank, fuel pump, and fuel rail (not shown). In addition, intake manifold 44 is shown communicating with optional electronic throttle 62 which adjusts a position of throttle plate 64 to control air flow from air intake 42 to intake manifold 44. In one example, a low pressure direct injection system may be used, where fuel pressure can be raised to approximately 20-30 bar. Alternatively, a high pressure, dual stage, fuel system may be used to generate higher fuel pressures. In some examples, throttle 62 and throttle plate 64 may be positioned between intake valve 52 and intake manifold 44 such that throttle 62 is a port throttle.

Distributorless ignition system 88 provides an ignition spark to combustion chamber 30 via spark plug 92 in response to controller 12. Universal Exhaust Gas Oxygen (UEGO) sensor 126 is shown coupled to exhaust manifold 48 upstream of catalytic converter 70. Alternatively, a two-state exhaust gas oxygen sensor may be substituted for UEGO sensor 126.

Exhaust gas may be recirculated from exhaust manifold 48 to intake manifold 44 via passage 45. EGR valve 47 may be selectively opened and closed via controller 12 to allow exhaust flow between exhaust manifold 48 and intake manifold 44. In some examples, the EGR flow rate may be measured or estimated based on a pressure drop across EGR valve 47 and EGR valve position.

Converter 70 can include multiple catalyst bricks, in one example. In another example, multiple emission control devices, each with multiple bricks, can be used. Converter 70 can be a three-way type catalyst in one example.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing force applied by foot 132; a measurement of engine manifold pressure (MAP) from pressure sensor 122 coupled to intake manifold 44; an engine position sensor from a Hall effect sensor 118 sensing crankshaft 40 position; a measurement of air mass entering the engine from sensor 120; and a measurement of throttle position from sensor 58. Barometric pressure may also be sensed (sensor not shown) for processing by controller 12. In a preferred aspect of the present description, engine position sensor 118 produces a predetermined number of equally spaced pulses every revolution of the crankshaft from which engine speed (RPM) can be determined.

In some examples, the engine may be coupled to an electric motor/battery system in a hybrid vehicle as shown in FIG. 2. Further, in some examples, other engine configurations may be employed, for example a diesel engine.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In a process hereinafter referred to as ignition, the injected fuel is ignited by known ignition means such as spark plug 92, resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is shown merely as an example, and that intake and exhaust valve opening and/or closing timings may vary, such as to provide positive or negative valve overlap, late intake valve closing, or various other examples.

FIG. 2 is a block diagram of a vehicle driveline 200 and vehicle 290. Driveline 200 may be powered by engine 10. Engine 10 may be started with an engine starting system shown in FIG. 1 or via DISG 240. Further, engine 10 may generate or adjust torque via torque actuator 204, such as a fuel injector, throttle, etc.

An engine output torque may be transmitted to an input side of dual mass flywheel 232. Engine speed as well as dual mass flywheel input side position and speed may be determined via engine position sensor 118. Dual mass flywheel 232 may include springs and separate masses (not shown) for dampening driveline torque disturbances. The output side of dual mass flywheel 232 is shown being mechanically coupled to the input side of disconnect clutch 236. Disconnect clutch 236 may be electrically or hydraulically actuated. A position sensor 234 is positioned on the disconnect clutch side of dual mass flywheel 232 to sense the output position and speed of the dual mass flywheel 232. The downstream side of disconnect clutch 236 is shown mechanically coupled to DISG input shaft 237.

DISG 240 may be operated to provide torque to driveline 200 or to convert driveline torque into electrical energy to be stored in electric energy storage device 275. DISG 240 has a higher output torque capacity than starter 96 shown in FIG. 1. Further, DISG 240 directly drives driveline 200 or is directly driven by driveline 200. There are no belts, gears, or chains to couple DISG 240 to driveline 200. Rather, DISG 240 rotates at the same rate as driveline 200. Electrical energy storage device 275 may be a battery, capacitor, or inductor. The downstream side of DISG 240 is mechanically coupled to the impeller 285 of torque converter 206 via shaft 241. The upstream side of the DISG 240 is mechanically coupled to the disconnect clutch 236. Torque converter 206 includes a turbine 286 to output torque to input shaft 270. Input shaft 270 mechanically couples torque converter 206 to automatic transmission 208. Torque converter 206 also includes a torque converter bypass lock-up clutch 212 (TCC). Torque is directly transferred from impeller 285 to turbine 286 when TCC is locked. TCC is electrically operated by controller 12. Alternatively, TCC may be hydraulically locked. In one example, the torque converter may be referred to as a component of the transmission. Torque converter turbine speed and position may be determined via position sensor 239. In some examples, 238 and/or 239 may be torque sensors or may be combination position and torque sensors.

When torque converter lock-up clutch 212 is fully disengaged, torque converter 206 transmits engine torque to automatic transmission 208 via fluid transfer between the torque converter turbine 286 and torque converter impeller 285, thereby enabling torque multiplication. In contrast, when torque converter lock-up clutch 212 is fully engaged, the engine output torque is directly transferred via the torque converter clutch to an input shaft (not shown) of transmission 208. Alternatively, the torque converter lock-up clutch 212 may be partially engaged, thereby enabling the amount of torque directly relayed to the transmission to be adjusted. The controller 12 may be configured to adjust the amount of torque transmitted by torque converter 212 by adjusting the torque converter lock-up clutch in response to various engine operating conditions, or based on a driver-based engine operation request.

Automatic transmission 208 includes gear clutches (e.g., gears 1-6) 211 and forward clutch 210. The gear clutches 211 and the forward clutch 210 may be selectively engaged to propel a vehicle. Torque output from the automatic transmission 208 may in turn be relayed to wheels 216 to propel the vehicle via output shaft 260. Specifically, automatic transmission 208 may transfer an input driving torque at the input shaft 270 responsive to a vehicle traveling condition before transmitting an output driving torque to the wheels 216.

Further, a frictional force may be applied to wheels 216 by engaging wheel brakes 218. In one example, wheel brakes 218 may be engaged in response to the driver pressing his foot on a brake pedal (not shown). In other examples, controller 12 or a controller linked to controller 12 may apply engage wheel brakes. In the same way, a frictional force may be reduced to wheels 216 by disengaging wheel brakes 218 in response to the driver releasing his foot from a brake pedal. Further, vehicle brakes may apply a frictional force to wheels 216 via controller 12 as part of an automated engine stopping procedure.

A mechanical oil pump 214 may be in fluid communication with automatic transmission 208 to provide hydraulic pressure to engage various clutches, such as forward clutch 210, gear clutches 211, and/or torque converter lock-up clutch 212. Mechanical oil pump 214 may be operated in accordance with torque converter 206, and may be driven by the rotation of the engine or DISG via input shaft 241, for example. Thus, the hydraulic pressure generated in mechanical oil pump 214 may increase as an engine speed and/or DISG speed increases, and may decrease as an engine speed and/or DISG speed decreases.

Controller 12 may be configured to receive inputs from engine 10, as shown in more detail in FIG. 1, and accordingly control a torque output of the engine and/or operation of the torque converter, transmission, DISG, clutches, and/or brakes. As one example, an engine torque output may be controlled by adjusting a combination of spark timing, fuel pulse width, fuel pulse timing, and/or air charge, by controlling throttle opening and/or valve timing, valve lift and boost for turbo- or super-charged engines. In the case of a diesel engine, controller 12 may control the engine torque output by controlling a combination of fuel pulse width, fuel pulse timing, and air charge. In all cases, engine control may be performed on a cylinder-by-cylinder basis to control the engine torque output. Controller 12 may also control torque output and electrical energy production from DISG by adjusting current flowing to and from field and/or armature windings of DISG as is known in the art.

When idle-stop conditions are satisfied, controller 42 may initiate engine shutdown by shutting off fuel and spark to the engine. However, the engine may continue to rotate in some examples. Further, to maintain an amount of torsion in the transmission, the controller 12 may ground rotating elements of transmission 208 to a case 259 of the transmission and thereby to the frame of the vehicle. In particular, the controller 12 may engage one or more transmission clutches, such as forward clutch 210, and lock the engaged transmission clutch (es) to the transmission case 259 and vehicle. A transmission clutch pressure may be varied (e.g., increased) to adjust the engagement state of a transmission clutch, and provide a desired amount of transmission torsion. When restart conditions are satisfied, and/or a vehicle operator wants to launch the vehicle, controller 12 may reactivate the engine by resuming cylinder combustion.

A wheel brake pressure may also be adjusted during the engine shutdown, based on the transmission clutch pressure, to assist in tying up the transmission while reducing a torque transferred through the wheels. Specifically, by applying the wheel brakes 218 while locking one or more engaged transmission clutches, opposing forces may be applied on transmission, and consequently on the driveline, thereby maintaining the transmission gears in active engagement, and torsional potential energy in the transmission gear-train, without moving the wheels. In one example, the wheel brake pressure may be adjusted to coordinate the application of the wheel brakes with the locking of the engaged transmission clutch during the engine shutdown. As such, by adjusting the wheel brake pressure and the clutch pressure, the amount of torsion retained in the transmission when the engine is shutdown may be adjusted.

In alternative examples, the electric machine may be coupled to one input of a multiple step fixed gear ratio transmission while the engine is coupled to a second input of the multiple step fixed gear ratio transmission. The multiple step fixed gear ratio transmission may include a planetary gear set to couple the engine to the electric machine. The method of FIG. 4 may be applied to this driveline configuration as well as others that are anticipated but not mentioned for the sake of brevity.

Thus, the system of FIGS. 1 and 2 provides for a hybrid vehicle system, comprising: an engine; a motor coupled to the engine; and a controller including non-transitory instructions executable to adjust motor torque in response to a difference between a driver demand torque and engine torque during a change in driver demand torque, the engine torque limited in response to a flow rate of EGR into the engine. The engine torque may be limited via limiting a throttle opening amount, cam timing, or fuel injection amount. The hybrid vehicle system includes where the engine inducts a gas mixture and further comprising additional instructions to enter the engine into a fuel cut-out state in response to an operating condition change that results in a fraction of the gas mixture comprising exhaust gas changing by more than a threshold percentage.

In some examples, the hybrid vehicle system includes where the driver demand torque is increasing. The hybrid vehicle system further comprises additional instructions to increase a negative output torque of the motor in response to a change in engine operating conditions that result in a decrease of engine exhaust gas recirculation amount. The hybrid vehicle system further comprises additional instructions to increase a positive output torque of the motor in response to a change in engine operating conditions that result in a decrease of engine exhaust gas recirculation amount. The hybrid vehicle system includes where the engine torque is limited via limiting a throttle opening amount, a fuel amount, or an amount of spark advance provided to the engine.

Referring now to FIG. 3, an example engine operating sequence is shown. The sequence of FIG. 3 may be provided via the system of FIGS. 1 and 2 executing instructions stored in non-transitory memory according to the method of FIG. 4. The sequence of FIG. 3 shows vertical markers $T_0$-$T_6$ which indicate particular times of interest during the operating sequence.

The first plot from the top of FIG. 3 is a plot of driver demand torque versus time. The X axis represents time and time begins at the left side of FIG. 3 and increases to the right side of FIG. 3. The Y axis represents driver demand torque and driver demand torque increases in the direction of the Y axis arrow. In one example, driver demand torque may be input via an accelerator pedal. A position of the accelerator pedal is converted to a desired driver demand torque. The driver demand torque may correspond to a desired transmission input torque. Thus, the driver demand torque may be provided via the engine shown in FIG. 2, the DISG shown in FIG. 2, or a combination of the engine and the DISG. The desired engine torque may be based on a split of the driver demand torque between the engine and the motor.

The second plot from the top of FIG. 3 is a plot of engine throttle position versus time. The X axis represents time and time begins at the left side of FIG. 3 and increases to the right side of FIG. 3. The Y axis represents throttle position and throttle position increases in the direction of the Y axis arrow. The throttle position may be adjusted based on a desired engine torque. The throttle opening amount increases with increasing throttle position.

The third plot from the top of FIG. 3 is a plot of actual engine EGR fraction versus time. The X axis represents time and time begins at the left side of FIG. 3 and increases to the right side of FIG. 3. The Y axis represents actual engine EGR fraction and actual engine EGR fraction increases in the direction of the Y axis arrow. The actual engine EGR fraction may be adjusted via adjusting a position of an EGR valve and/or overlap amount between open intake valves and open exhaust valves. In one example, the actual engine EGR fraction may be determined as a sum of internal and external EGR. The external EGR amount or flow rate may be determined via a pressure drop across an EGR valve and EGR valve position. Internal EGR amount or flow rate may be determined from empirically determined EGR fractions that are based in intake and exhaust valve overlap, engine speed, and engine load.

The fourth plot from the top of FIG. 3 is a plot of desired engine EGR fraction versus time. The X axis represents time and time begins at the left side of FIG. 3 and increases to the right side of FIG. 3. The Y axis represents desired engine EGR fraction and desired engine EGR fraction increases in the direction of the Y axis arrow. The desired engine EGR fraction may be based on engine speed and load. For example, empirically determined EGR fractions may be stored in a table or function that is indexed via engine speed and load. Engine load may be defined as an inducted engine air mass divided by a maximum theoretical inducted engine air mass. The EGR valve position may be adjusted based on the desired engine EGR fraction. In one example, the desired engine EGR fraction is a fraction of gas inducted to an engine that is comprised of exhaust gas. For example, if an engine inducts X grams/minute of gas (e.g., comprising air and EGR) and 0.3 times X grams of the gas is the EGR, then the desired EGR fraction is 30% of the inducted gas mass.

The fifth plot from the top of FIG. 3 is a plot of a state of a fuel injection enable flag versus time. The X axis represents time and time begins at the left side of FIG. 3 and increases to the right side of FIG. 3. The Y axis represents the state of a fuel injection enable flag. Fuel injection to the engine is deactivated when the fuel injection enable flag trace is at a lower level near the X axis. Fuel injection to the engine is activated when the fuel injection enable flag trace is at a higher level near the Y axis arrow. Fuel injectors are enabled and operating when the fuel injection enable trace is at a higher level.

The sixth plot from the top of FIG. 3 is a plot of engine output torque versus time. The X axis represents time and time begins at the left side of FIG. 3 and increases to the right side of FIG. 3. The Y axis represents engine output torque and engine output torque increases in the direction of the Y axis arrow. The engine torque may be adjusted via the throttle, spark advance, cam timing, and fuel injection amount.

The seventh plot from the top of FIG. 3 is a plot of electric machine or DISG output torque versus time. The X axis represents time and time begins at the left side of FIG. 3 and increases to the right side of FIG. 3. The Y axis represents electric machine or DISG output torque and electric machine torque or DISG torque increases in the direction of the Y axis arrow. DISG torque is positive above the X axis, negative below the X axis, and zero at the X axis.

At time $T_0$, driver demand torque is at a middle level and the throttle is partially open in response to the driver demand torque. The actual and desired EGR fractions are also at a middle level and fuel injection is enabled so that the engine is combusting air-fuel mixtures. The engine torque is at a middle level and the electric machine torque is substantially zero.

At time $T_1$, the driver demand torque is reduced in response to a driver releasing an accelerator pedal. The throttle position is initially reduced to lower engine torque in response to the driver demand torque reduction. Fuel injection is deactivated in response to the desired EGR fraction changing by more than a threshold EGR fraction or percentage. Alternatively, the fuel injection may be deactivated in response to the change in driver demand torque or engine torque. The actual EGR fraction briefly increases after the change in driver demand torque and/or engine torque. The actual EGR fraction may increase due to differences between EGR system dynamics and engine air flow dynamics. For example, the actual EGR fraction may increase due to an EGR valve that closes slower than a throttle or due to the time it takes to adjust intake and exhaust valve opening time overlap. The engine torque is reduced in response to fuel flow being cut off or stopped to the engine. The electric machine output torque is increased in a positive direction in response to ceasing fuel flow to the engine. However, it should be noted that DISG torque may also turn negative to that the DISG may absorb driveline torque for at least a portion of the time the vehicle is decelerating in response to the reduction in driver demand torque. Further, shortly after fuel flow to the engine is deactivated, the throttle opening amount is increased.

By increasing the throttle opening amount while the EGR valve is being closed and intake and exhaust valve overlap is decreasing, the EGR fraction of gas in the engine intake system is reduced. Consequently, the EGR fraction of gas entering engine cylinders is reduced. Additionally, the possibility of engine misfire is reduced since combustion is deactivated via stopping fuel flow to the engine.

Between time $T_1$ and time $T_2$, the DISG torque is gradually reduced to control vehicle deceleration based on a desired vehicle deceleration rate. In some examples, the DISG torque may transition to a negative torque to control vehicle deceleration.

At time $T_2$, the driver demand torque remains at a lower level and the throttle opening amount decreases in response to the EGR fraction in the engine intake and cylinders being less than a threshold EGR fraction. In some examples, the throttle may be closed in response to a number of cylinder induction events that correspond to evacuating a desired volume of the intake system.

For example, if the intake system volume is 2.5 times the engine cylinder volume and it is desired to evacuate the intake system volume before reactivating engine cylinders, the engine performs two induction events for each cylinder plus an additional induction event for half of the engine cylinders before the throttle is closed and combustion is reinitiated in engine cylinders. Alternatively, the throttle may be closed after a predetermined volume of the engine's intake system is evacuated via cylinder induction events without activating fuel flow so that oxidation of the after treatment catalyst may be reduced while fuel consumption is reduced.

In other examples, the throttle may be opened and a portion of volume of gas in the engine intake system may be inducted into the engine until the actual EGR fraction in the engine intake system is a desired EGR fraction. Then, the throttle may be closed. Thus, the throttle is opened only long enough for the actual EGR fraction to reach a desired EGR fraction and then it begins to close to a desired opening amount. Fuel injection remains deactivated until intake manifold pressure is reduced to a threshold pressure so as to limit engine torque without having to supply significant spark retard.

The actual EGR fraction is reduced to a lower level and the fuel injection is reactivated in response to the actual EGR fraction reaching a predetermined desired EGR fraction. In other examples, the fuel injection may remain off until engine speed is reduced to a desired level or until an increase in engine output torque is requested. The engine torque is increased as the fuel injection is reactivated.

It should be noted that if the accelerator pedal is completely released by the driver a vehicle deceleration is desired and fuel is cut-off. The DISG enters an absorbing mode during such conditions to control vehicle deceleration. On the other hand, if the accelerator pedal or driver demand is only partially reduce (e.g., pedal is not released and/or driver demand torque is greater than zero), the DISG may provide positive torque to the vehicle driveline while the fuel is cut-off and the throttle is controlled (e.g., opened and then closed) to purge EGR from the engine intake manifold.

At time $T_3$, the driver demand torque is increased in response to a driver increasing a torque demand via an accelerator pedal (not shown). The throttle opening amount is increased and the actual and desired EGR fraction increase with the increasing driver demand torque. The engine torque is limited in response to EGR dynamics so that the possibility of engine knock during acceleration may be reduced. Engine torque may be limited via limiting the throttle opening amount or valve timing. Since engine torque is limited, DISG output torque is increased to provide torque such that the engine torque plus the DISG torque equals the driver demand torque. The DISG torque is reduced as the engine torque approaches the driver demand torque. The fuel injection remains activated so that the engine produces torque for the vehicle driveline.

At time $T_4$, the driver demand torque is again reduced in response to a driver releasing an accelerator pedal. The throttle position is initially reduced to lower engine torque in response to the driver demand torque reduction. Additionally, the rate of change in desired EGR fraction is reduced by more than a threshold amount. During this reduction in driver demand torque, the engine torque remains positive and the throttle opening amount does not increase. Thus, the controller may vary its response to varying engine conditions to reduce the possibility of engine misfire. The throttle opening amount is reduced to a level where the engine may continue to operate at a speed and load with a desired level of combustion stability at the present EGR fraction in the engine intake system. The negative torque output of the DISG is increased to offset the engine output torque such that the driver demand torque is provided when the engine output torque and DISG torque are added together. The desired EGR fraction is reduced based on engine speed and load. As time goes on, the actual EGR fraction is reduced toward the desired EGR fraction by adjusting intake valve and exhaust valve opening time overlap along with at least partially closing the EGR valve (not shown). Fuel injection remains active and the engine continues to combust air-fuel mixtures while the EGR fraction is reduced via inducting gases from the engine intake system.

Between time $T_4$ and time $T_5$, the actual EGR fraction is reduced while the electric machine controls vehicle deceleration based on a desired vehicle deceleration rate. The engine continues to combust air-fuel mixtures and the driver demand torque is reduced.

At time $T_5$, the actual EGR fraction is reduced to level of the desired EGR fraction and the throttle opening amount and engine torque are reduced to lower fuel consumption and drive the engine output torque toward the driver demand torque. Since the actual EGR fraction is reduced the engine may be operated at a lower load with a reduced possibility of misfire. The electric machine negative output torque is decreased as the engine output torque is decreased. The fuel injection remains activated and the engine continues to combust an air-fuel mixture.

At time $T_6$, the driver demand torque is increased in response to a driver increasing a torque demand via an accelerator pedal (not shown). The throttle opening amount is increased and the actual and desired EGR fraction increases with the increasing driver demand torque. The engine torque is again limited in response to EGR dynamics so that the possibility of engine knock during acceleration may be reduced. Engine torque may be limited via limiting the throttle opening amount or valve timing. Since engine torque is limited, electric machine output torque is increased to provide torque such that the engine torque plus the DISG torque equals the driver demand torque. Engine output torque is increased as the EGR fraction approaches the desired EGR fraction. The DISG torque is reduced as the engine torque approaches the driver demand torque. The fuel injection remains activated so that the engine produces torque for the vehicle driveline.

Figure 4:
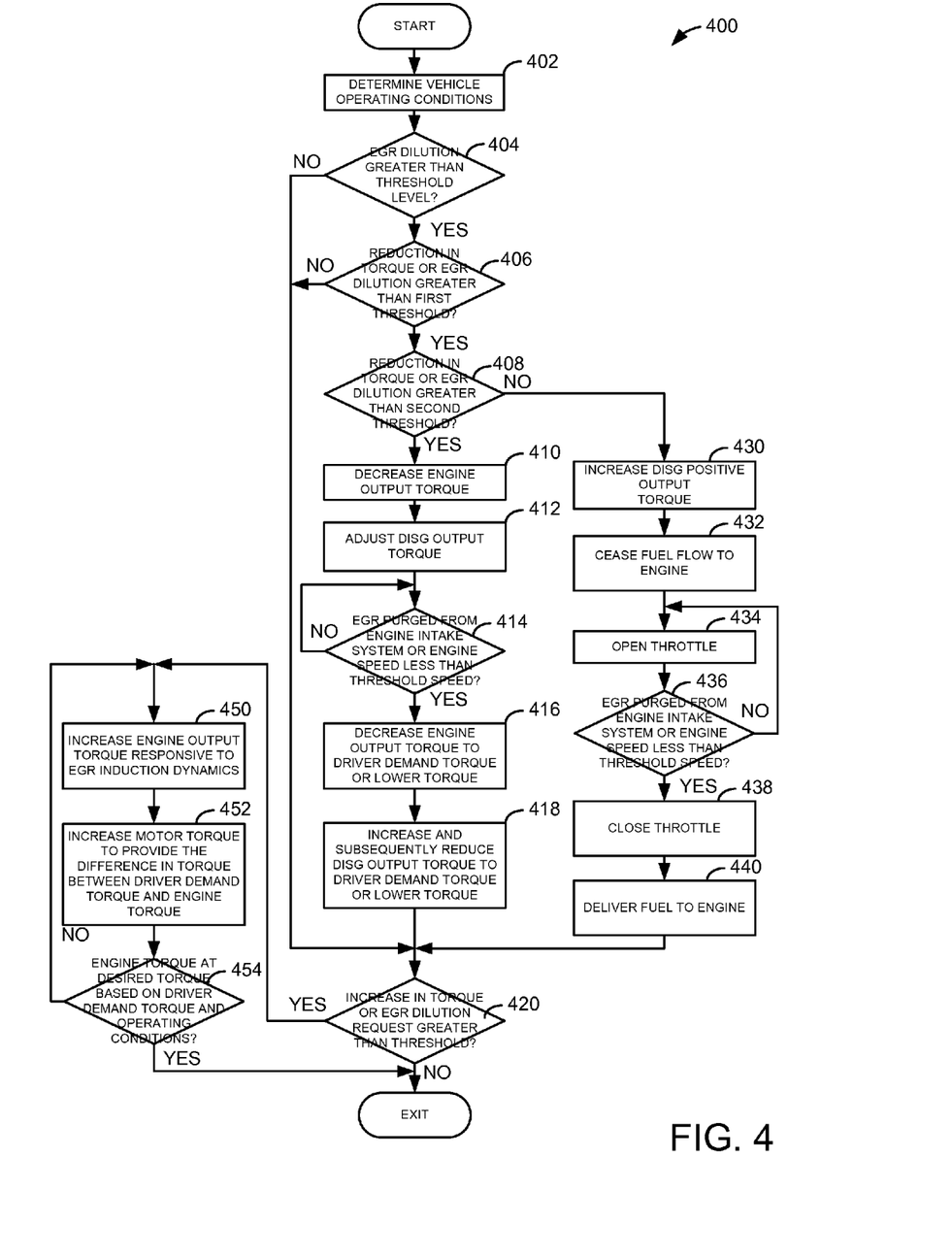
FIG. 4 is a flowchart showing one example method for operating an engine.

In this way, the method of FIG. 4 may provide different responses to a change in engine load when the engine is operating with a higher EGR fraction. The two different responses to a change in engine load may be based on the rate of change in engine load, magnitude of change in engine load over a specified duration, change in desired EGR fraction over a specified duration, rate of change in desired EGR fraction, or other appropriate conditions.

Referring now to FIG. 4, a flowchart of an example method to operate an engine of a vehicle is shown. The method of FIG. 4 may be stored as executable instructions in non-transitory memory of controller 12 shown in FIGS. 1 and 2. The method of FIG. 4 may provide the prophetic operating sequence shown in FIG. 3.

At 402, method 400 determines operating conditions. Operating conditions may include but are not limited to engine torque demand, engine speed, engine torque, DISG speed and torque, vehicle speed, ambient temperature and pressure, driver demand torque, desired EGR fraction, actual EGR fraction or EGR amount, DISG torque, and battery state of charge. Driver demand torque demand may be derived from accelerator pedal 130 and controller 12 of FIG. 1. Engine torque may be estimated from engine speed and load. Method 400 proceeds to 404 after operating conditions are determined.

At 404, method 400 judges whether or not the present actual EGR fraction or EGR rate is greater than a threshold level (e.g., greater than 25% of gas entering a cylinder) for the engine at the present operating conditions. In one example, the threshold level is an EGR fraction that may result in engine misfires at lower engine speeds and loads. If method 400 judges that the present actual EGR fraction or EGR rate is greater than the threshold level, method 400 proceeds to 406. Otherwise, method 400 proceeds to 420. The actual EGR fraction may be determined by dividing an estimated EGR flow rate by the sum of the engine air flow rate and the estimated EGR flow rate. The EGR flow rate may be determined via a pressure drop across an EGR valve and EGR valve position. The engine air flow rate may be determined via an air flow meter or from engine speed and intake manifold pressure.

At 406, method 400 judges whether or not a reduction in desired engine torque demand is greater than a first engine torque demand threshold reduction during a specified duration or if a reduction in desired inducted EGR fraction is greater than a first inducted EGR fraction threshold reduction during a specified duration. Alternatively, method 400 may judge whether or not the desired engine EGR fraction is changing at a higher rate than a first threshold rate, or if a desired engine EGR amount is changing by more than a first threshold amount, or if engine load is changing by more than a first threshold amount, or if engine speed is changing by more than a first threshold amount as a basis for taking actions to reduce the possibility of engine misfire resulting from the engine inducting higher amounts of EGR. For example, the mentioned conditions may be present when an engine transitions from a first engine speed and load to a second engine speed and load, the first engine speed and load greater than the second engine speed and load.

If method 400 judges that the desired inducted EGR fraction is greater than a first desired inducted EGR fraction threshold reduction, or alternatively, if the other described conditions are present, the answer is yes and method 400 proceeds to 408. Otherwise, the answer is no and method 400 proceeds 420.

It should be noted that the desired EGR fraction may be determined via controller 12 based on engine operating conditions (e.g., based on engine speed and load). Likewise, the states of other desired values of control variables may be determined via controller 12.

At 408, method 400 judges whether or not a reduction in desired engine torque demand is greater than a second engine torque demand threshold reduction during a specified duration or if a reduction in desired inducted EGR fraction is greater than a second inducted EGR fraction threshold reduction during a specified duration. Alternatively, method 400 may judge whether or not the desired engine EGR fraction is changing at a higher rate than a second threshold rate, or if a desired engine EGR amount is changing by more than a second threshold amount, or if engine load is changing by more than a second threshold amount, or if engine speed is changing by more than a second threshold amount as a basis for taking actions to reduce the possibility of engine misfire resulting from the engine inducting higher amounts of EGR. If method 400 judges that the desired inducted EGR fraction is greater than a second inducted EGR fraction threshold reduction, or alternatively, if the other described conditions are present, the answer is yes and method 400 proceeds to 410. Otherwise, the answer is no and method 400 proceeds 430.

In other examples, a yes answer at 408 may result in method 400 proceeding to 430. A no answer at 408 may result in method 400 proceeding to 410. Thus, the response to a change in operating conditions may be different for different systems where the DISG has less or more torque output capacity than for the presently described system.

At 430, method 400 increases DISG or electric machine torque output to compensate (e.g., increase the DISG torque to replace the engine torque) the reduction in driveline torque that will occur when fuel flow to the engine is deactivated. In one example, the DISG or electric machine torque is increased to a torque that is within a predetermined torque range of the engine output torque before fuel flow to the engine is stopped. For example, the DISG torque may be increased to provide 95% of torque the engine supplied to the driveline before fuel flow to the engine is deactivated. Thus, DISG output torque replaces engine torque to improve vehicle drivability.

Additionally, the DISG or electric machine output torque may be adjusted to increase relative to engine position. For example, the DISG torque is increased based on a timing of a last fuel injection event to an engine cylinder before combustion in the engine ceases. In another example, the DISG output torque may be increased based on timing of a predicted last combustion event after a last fuel injection event before combustion in the engine ceases.

The DISG output torque is also adjusted to provide a desired rate of vehicle deceleration after fuel flow to the engine ceases. Thus, the DISG output torque may be increased and then decreased in response to a reduction in the requested EGR fraction or requested engine torque. Method 400 proceeds to 432 after DISG positive torque is increased.

At 432, method 400 ceases fuel flow to engine cylinders. In one example, fuel flow is ceased to the engine and combustion continues in the engine until fuel injected before fuel injection was ceased is combusted. Method 400 proceeds to 434 after fuel injection is ceased.

At 434, method 400 increases the opening amount of the engine throttle. Opening the throttle reduces the EGR fraction inducted into engine cylinders by increasing the fraction of air in the gas inducted to engine cylinders. The throttle opening amount may be adjusted based on a desired EGR fraction reduction rate. If the EGR fraction reduction rate is high, the throttle is opened faster and to a greater opening amount. If the EGR fraction reduction rate is low, the throttle is opened slower and to a smaller opening amount. The desired EGR fraction reduction rate may be based on the EGR fraction before the change in EGR fraction or engine load. In alternative examples, the throttle may be opened a predetermined amount or to a predetermined position. Method 400 proceeds to 436 after the throttle is opened.

At 436, method 400 judges whether or not EGR has been purged from the engine intake system to the extent that the EGR fraction in the intake manifold or being inducted into engine cylinders equals the desired EGR fraction. Additionally, method 400 judges whether or not engine speed has decreased to less than a threshold engine speed. In some examples, it may be judged that the EGR fraction is reduced to a desired level after a predetermined number of cylinder intake events after fuel injection to the engine is ceased. In other examples, the EGR fraction being inducted to engine cylinders may be determined to be reduced to a desired EGR fraction based on the amount of EGR flowing into the engine and the amount of air flowing into the engine. In one example, the EGR fraction in the engine intake system is solved according to a pump/tank model. If method 400 judges that the EGR fraction being inducted to engine cylinders or in the engine intake system is less than a threshold EGR fraction or if engine speed is less than a threshold speed the answer is yes and method 400 proceeds to 438. Otherwise, the answer is no and method 400 returns to 434.

At 438, method 400 at least partially closes the engine throttle. In one example, the engine throttle is closed to a position where engine air flow will provide a desired amount of torque when the engine is operated at stoichiometric conditions at the present engine speed. Thus, the engine throttle is adjusted to a position to provide a desired air flow. Method 400 proceeds to 440 after the throttle is at least partially closed.

At 440, method 400 reactivates fuel delivery to the engine and combustion begins. The fuel may be reactivated sequentially to improve engine emissions. Additionally, if the DISG torque is still positive, the DISG torque is reduced as the engine begins to provide torque. The DISG torque may be reduced at the rate the engine torque is increasing. Method 400 proceeds to 420 after fuel delivery to the engine is resumed.

At 410, method 400 decreases engine output torque in response to the reduction in requested engine torque or in response to the reduction in EGR fraction inducted to engine cylinders being greater than a threshold EGR fraction reduction. In one example, the engine output torque is reduced to a lowest level that will allow the engine to operate with the EGR fraction that is delivered to the engine before the reduction in engine torque or desired EGR fraction occurs. For example, if the engine is operating at 0.6 load and 0.25 EGR fraction to provide 100 N-m of torque before the driver demand torque is lowered to 35 N-m, the engine load may be reduced to 0.3 load which is the lowest engine load that supports a desired level of combustion stability with a 0.25 EGR fraction. The engine load may be reduced as the EGR fraction is reduced. In other examples, the engine output torque may be reduced to a predetermined torque that is based on the engine output torque and engine speed before the reduction in engine torque or desired EGR fraction occurs. Method 400 proceeds to 412 after the reduction in engine output torque begins.

At 412, method 400 adjusts the DISG torque to provide the desired driver demand torque added to the engine torque. The DISG torque may be increased to a positive DISG output torque or the DISG may output a negative torque that is increases depending on the engine output torque and the desired driver demand torque. For example, if the driver demand torque is greater than the engine torque, the DISG torque is increased so that the sum of engine torque and DISG torque is within a predetermined torque of the desired driver demand torque (e.g., ±5 N-m). On the other hand, if the driver demand torque is less than the engine torque, the DISG torque is negative to absorb engine torque so that the sum of engine torque and DISG torque is within the predetermined torque of the desired driver demand torque. Method 400 proceeds to 414 after the DISG torque is adjusted.

At 414, method 400 judges whether or not EGR has been purged from the engine intake system to the extent that the EGR fraction in the intake manifold or being inducted into engine cylinders is less than a desired EGR fraction. Additionally, method 400 judges whether or not engine speed has decreased to less than a threshold engine speed. In some examples, it may be judged that the EGR fraction is reduced to a desired level after a predetermined number of cylinder intake events after fuel injection to the engine is ceased. In other examples, the EGR fraction being inducted to engine cylinders may be determined to be reduced to a desired EGR fraction based on the amount of EGR flowing into the engine and the amount of air flowing into the engine. In one example, the EGR fraction in the engine intake system is solved according to a pump/tank model. If method 400 judges that the EGR fraction being inducted to engine cylinders or in the engine intake system is less than a threshold EGR fraction or if engine speed is less than a threshold speed the answer is yes and method 400 proceeds to 416. Otherwise, the answer is no and method 400 returns to 414. Method 400 compares engine speed to the threshold engine speed to ensure that the engine may continue to rotate without stopping.

At 416, method 400 adjusts engine torque to the driver demand torque or a lower torque. The engine torque may be reduced via reducing the throttle opening amount and the amount of fuel supplied to the engine. Alternatively, the throttle opening amount and cam timing may be adjusted to reduce engine output torque. Method 400 proceeds to 418 after engine torque is reduced.

At 418, method 400 supplies positive torque to the driveline via the DISG in response to engine torque being reduced. The DISG torque is subsequently reduced to control vehicle deceleration (e.g., time $T_5$ of FIG. 3). The DISG torque is initially increased in a positive direction to a torque that is within a predetermined torque of the engine torque before the engine torque is reduced to the driver demand torque. Method 400 proceeds to 420 after the DISG torque is adjusted.

At 420, method 400 judges whether or not there is an increase in driver demand torque greater than a threshold torque and/or if engine torque is greater than a threshold torque. Further, method 400 may judge whether or not desired EGR fraction has increased by greater than a threshold EGR fraction. If the answer is yes to any of the mentioned conditions, method 400 proceeds to 450. Otherwise, the answer is no and method 400 proceeds to exit.

At 450, method 400 increases engine output torque responsive to the desired driver demand torque and EGR dynamics. In particular, the increase in engine output torque may be limited based on the dynamics of how quickly the actual EGR fraction matches the desired EGR fraction. In some examples, the EGR fraction rate of increase may be limited by the response of the EGR valve, response of cam actuators, and intake manifold volume. Therefore, in one example, the response of throttle and/or cam timing adjustments is slowed to match the dynamics of EGR. In one example, the rate air flow increase through the throttle is limited to or based on EGR flow increase. For example, if the EGR flow rate increases by 10% over a specific duration, the air flow through the throttle may be limited to a 10% flow increase over the same period as the EGR flow rate increase. In other examples, the EGR flow dynamics may be measured and then the engine air flow dynamics are limited to progressing at the same rate as the EGR flow dynamics via limiting the throttle opening rate or cam timing adjustment rate. Method 400 proceeds to 452 after the engine torque output is increased responsive to EGR flow dynamics.

At 452, method 400 adjusts the DISG output torque to provide the difference between the engine output torque and driver demand torque. The desired engine torque may be based on the driver demand torque. If the driver demand torque evolves slowly, the DISG output torque is not adjusted when there is no difference between the engine torque and the desired driver demand torque. If the driver demand torque evolves more rapidly, the DISG output torque may initially increase and subsequently decrease as engine output torque matches driver demand torque. In this way, DISG output torque may be adjusted so that the driver demand torque is provided while engine torque progresses toward driver demand torque.

In some examples where the DISG is providing a portion of driver demand torque before driver demand torque is increased, the DISG output torque is adjusted to provide the torque difference between the engine output torque and the driver demand torque. Method 400 proceeds to 454 after DISG output torque is adjusted.

At 454, method 400 judges whether or not engine torque is at a desired engine torque based on the drive demand torque and vehicle operating conditions. If the engine outputs the desired engine torque, the answer is yes and method 400 proceeds to exit. Otherwise, method 400 returns to 450 and engine output torque continues to increase at a rate that is based on a flow rate that EGR flow increase into the engine.

Thus, the method of FIG. 4 provides for a method for operating an engine, comprising: inducting a gas mixture into a cylinder, a fraction of the gas mixture comprised of exhaust gas, at least a portion of the gas mixture participating in combustion in the cylinder; and entering the engine into a fuel cut-out state in response to an operating condition change that results in the fraction of the gas mixture changing by more than a threshold percentage. The method of includes where the fraction of the gas mixture comprised of exhaust gas is greater than 25% of the gas mixture and where the gas mixture is inducted at a first engine speed and load. The method also includes where the change in operating condition is a change from the first engine speed and load to a second engine speed and load, the second engine speed and load different than the first engine speed and load.

In some examples, the method further comprises increasing an opening amount of a throttle in response to the operating condition change. The method further comprises increasing positive torque output of a motor to supply torque to a driveline, the engine mechanically coupled to the driveline. The method further comprises adjusting the motor to decelerate a vehicle. The method includes where the fraction of the gas mixture is changed via at least partially closing an EGR valve.

In another example, the method of FIG. 4 provides for a method for operating an engine, comprising: entering an engine into a fuel cut-out state in response to an engine operating condition change that results in a fraction of an exhaust gas within a gas mixture inducted into a cylinder changing by more than a threshold percentage during a first condition; and increasing torque output of a motor and decreasing torque output of the engine while continuing combustion in the engine in response to an operating condition that results in the fraction of an exhaust gas within a gas mixture inducted into the cylinder changing by more than the threshold percentage during a second condition different than the first condition.

Additionally, the method includes where the first condition is a first reduction in driver demand torque and where the second condition is a second reduction in driver demand torque, the first reduction in driver demand torque greater than the second reduction in driver demand torque. The method further comprises increasing a positive torque output of the motor during the first condition, and where torque output from the motor is negative during the second condition. The method further comprises at least partially opening a throttle during the first condition, and at least partially closing the throttle during the second condition. The method further comprises at least partially closing an EGR valve during the first and second conditions. The method further comprises decelerating a vehicle via the motor during the first and second conditions. The method further comprises adjusting engine output torque responsive to a fraction of exhaust gas within gases in an intake manifold of the engine.

As will be appreciated by one of ordinary skill in the art, method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps or functions may be repeatedly performed depending on the particular strategy being used. This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method for operating an engine, comprising:
   inducting a gas mixture into a cylinder, a fraction of the gas mixture comprised of exhaust gas, at least a portion of the gas mixture participating in combustion in the cylinder; and
   entering the engine into a fuel cut-out state in response to the fraction of the gas mixture changing by more than a threshold percentage.

2. The method of claim 1, where the fraction of the gas mixture comprised of exhaust gas is greater than 25% of the gas mixture and where the gas mixture is inducted at a first engine speed and load.

3. The method of claim 2, further comprising exiting the fuel cut-out state and operating the engine in response to an EGR fraction inducted into the cylinder after entering the fuel cut-out state being less than a threshold.

4. The method of claim 1, further comprising increasing an opening amount of a throttle in response to an operating condition change.

5. The method of claim 4, further comprising increasing positive torque output of a motor to supply torque to a driveline, the engine mechanically coupled to the driveline.

6. The method of claim 5, further comprising increasing a negative torque output from the motor to decelerate a vehicle.

7. The method of claim 1, where the fraction of the gas mixture is changed via at least partially closing an EGR valve.

8. A method for operating an engine, comprising:
   entering the engine into a fuel cut-out state in response to a fraction of an exhaust gas within a gas mixture inducted into a cylinder changing by more than a threshold during a first condition; and
   increasing torque output of a motor and decreasing torque output of the engine while continuing combustion in the engine in response to a fraction of an exhaust gas within a gas mixture inducted into the cylinder changing by more than the threshold during a second condition different than the first condition.

9. The method of claim 8, where the first condition is a first reduction in driver demand torque and where the second condition is a second reduction in driver demand torque, the first reduction in driver demand torque greater than the second reduction in driver demand torque.

10. The method of claim 8, further comprising increasing a positive torque output of the motor during the first condition, and where torque output from the motor is negative during the second condition.

11. The method of claim 8, further comprising at least partially opening a throttle during the first condition, and at least partially closing the throttle during the second condition.

12. The method of claim 8, further comprising at least partially closing an EGR valve during the first and second conditions, and further comprising exiting the fuel cut-out state and operating the engine in response to an EGR fraction inducted into the cylinder after entering the fuel cut-out state being less than a threshold.

13. The method of claim 8, further comprising decelerating a vehicle via the motor during the first and second conditions.

14. The method of claim 8, further comprising limiting a rate of air flow through a throttle based on EGR flow.

15. A hybrid vehicle system, comprising:
an engine;
a motor coupled to the engine; and
a controller including executable instructions stored in non-transitory memory to adjust motor torque in response to a difference between a driver demand torque and engine torque during a change in driver demand torque, the engine torque limited in response to a flow rate of EGR into the engine.

16. The hybrid vehicle system of claim 15, where the engine inducts a gas mixture and further comprising additional instructions to enter the engine into a fuel cut-out state in response to an operating condition change that results in a fraction of the gas mixture comprising exhaust gas changing by more than a threshold percentage.

17. The hybrid vehicle system of claim 16, where the driver demand torque is increasing, and further instructions comprising exiting the fuel cut-out state and operating the engine in response to an EGR fraction inducted into a cylinder after entering the fuel cut-out state being less than a threshold.

18. The hybrid vehicle system of claim 15, further comprising additional instructions to increase a negative output torque of the motor in response to a change in engine operating conditions that result in a decrease of engine exhaust gas recirculation amount.

19. The hybrid vehicle system of claim 15, further comprising additional instructions to increase a positive output torque of the motor in response to a change in engine operating conditions that result in a decrease of engine exhaust gas recirculation amount.

20. The hybrid vehicle system of claim 15, where the engine torque is limited via limiting a throttle opening amount, a fuel amount, or an amount of spark advance provided to the engine.

* * * * *